United States Patent [19]

Kelley

[11] Patent Number: 4,796,803

[45] Date of Patent: * Jan. 10, 1989

[54] AIR VOLUME REGULATOR VALVE

[76] Inventor: Winfield L. Kelley, 1501 Brickell Ave., Miami, Fla. 33129

[*] Notice: The portion of the term of this patent subsequent to Apr. 26, 2005 has been disclaimed.

[21] Appl. No.: 109,909

[22] Filed: Oct. 19, 1987

Related U.S. Application Data

[63] Continuation-in-part of Ser. No. 880,101, Jun. 30, 1982, Pat. No. 4,739,924, which is a continuation-in-part of Ser. No. 712,762, Mar. 18, 1985, abandoned.

[51] Int. Cl.⁴ ............................................. F24F 11/053
[52] U.S. Cl. ........................................ 236/49; 98/41.3; 137/625.33
[58] Field of Search .............. 137/601, 625.33, 625.39; 236/49 B; 98/41.3; 251/205, 206

[56] References Cited

U.S. PATENT DOCUMENTS

| | | | |
|---|---|---|---|
| 2,217,479 | 10/1940 | Guyer | 98/41.3 |
| 2,601,304 | 6/1952 | Lane | 251/206 X |
| 2,896,662 | 7/1959 | Thomas | 137/538 |
| 2,933,100 | 4/1960 | Waterfill | 137/625.33 X |
| 2,975,975 | 3/1961 | Weber | 236/49 B |
| 3,073,525 | 1/1963 | Cislo | 98/41.3 X |
| 3,144,238 | 8/1964 | Williams | 251/206 |
| 3,206,117 | 9/1965 | Anderson et al. | 236/1 B |
| 3,312,241 | 4/1967 | Bryant | 137/625.33 X |
| 3,363,536 | 1/1968 | Dean | 98/41.3 |
| 3,428,251 | 2/1969 | Gross et al. | 236/92 R |
| 3,752,223 | 8/1973 | Finch | 98/41.3 X |
| 3,805,838 | 4/1974 | Christensen | 137/625.32 |
| 3,990,871 | 11/1976 | Cooper | 251/205 X |
| 4,051,864 | 10/1977 | Iwatsuki | 137/504 |
| 4,139,150 | 2/1979 | Grauerson et al. | 236/1 B |
| 4,176,690 | 12/1979 | Clark et al. | 137/504 X |
| 4,501,389 | 2/1985 | Kolt | 236/49 |
| 4,518,032 | 5/1985 | Funasaki et al. | 236/49 X |
| 4,523,713 | 6/1985 | Kline et al. | 236/49 B X |

FOREIGN PATENT DOCUMENTS

| | | |
|---|---|---|
| 1072407 | 12/1959 | Fed. Rep. of Germany ........... 137/625.32 |
| 2832774 | 2/1980 | Fed. Rep. of Germany ....... 98/41.3 |

Primary Examiner—Martin P. Schwadron
Assistant Examiner—Stephen M. Hepperle
Attorney, Agent, or Firm—Stevens, Davis, Miller & Mosher

[57] ABSTRACT

Disclosed is an air volume regulator valve for an air distribution apparatus for heating, ventilating and air conditioning systems having a first open position, a closed position and a second open position and means for maintaining relatively constant volume of airflow under changing air inlet pressures. The valve may be cylindrical, flat or corrugated and has a "dead band" feature to allow the valve to better assist in controlling temperature of a room or plenum chamber to be heated or cooled.

4 Claims, 4 Drawing Sheets

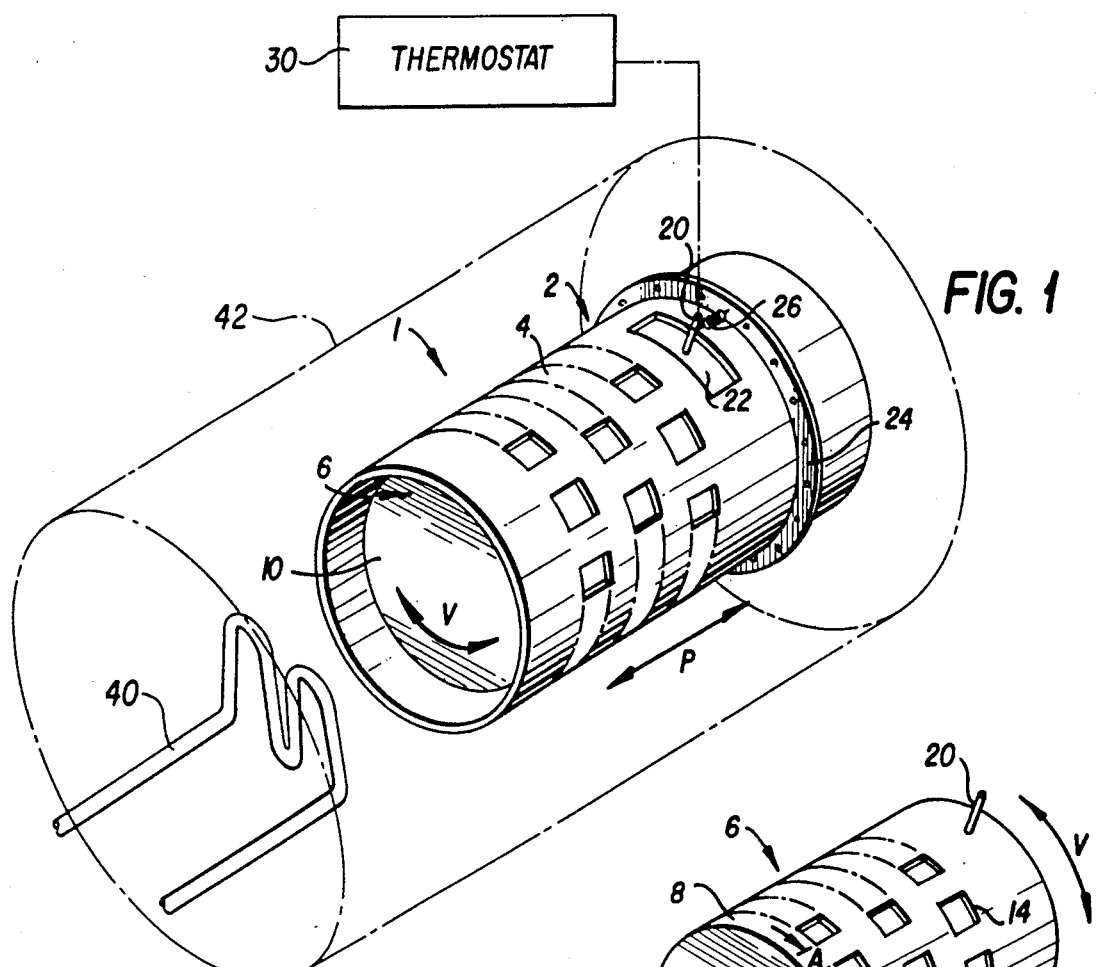
FIG. 1
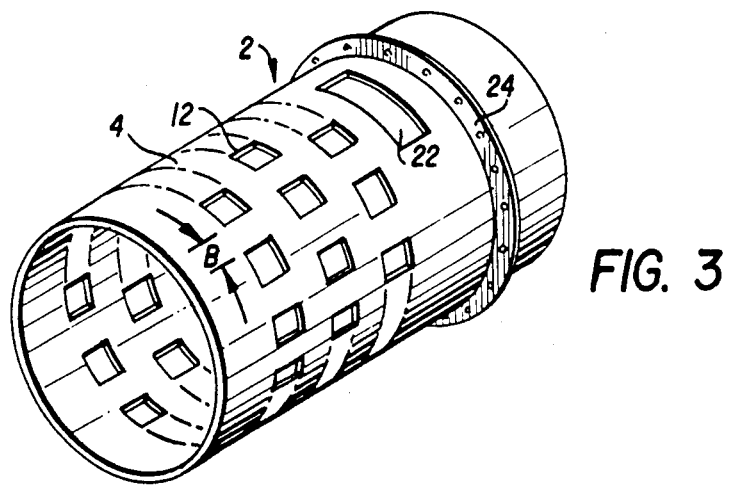
FIG. 2
FIG. 3

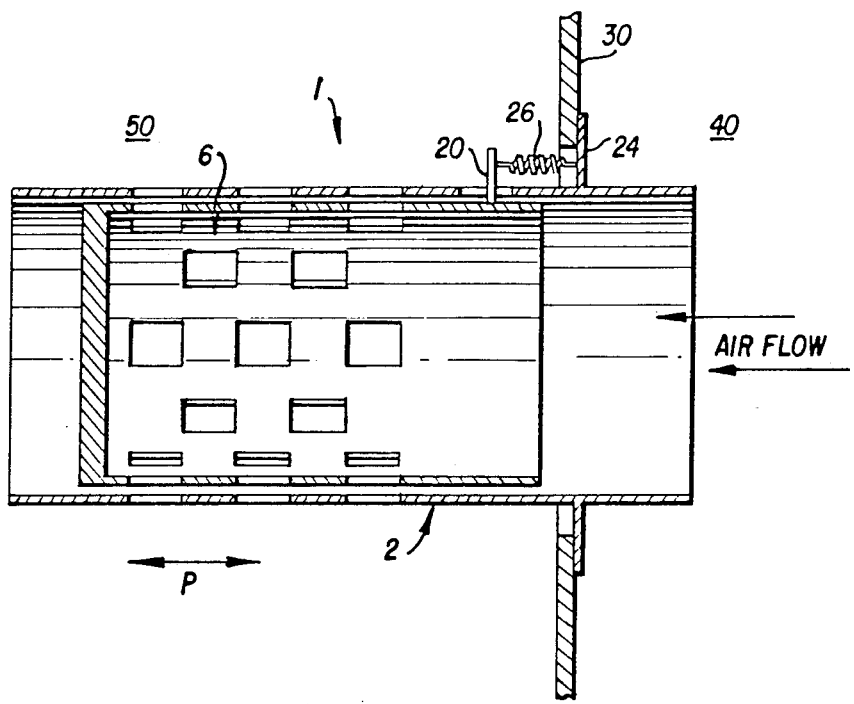
FIG. 4
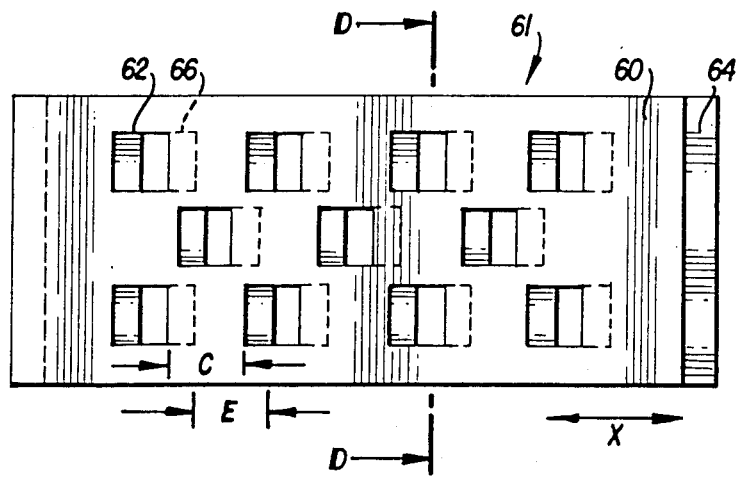
FIG. 5A
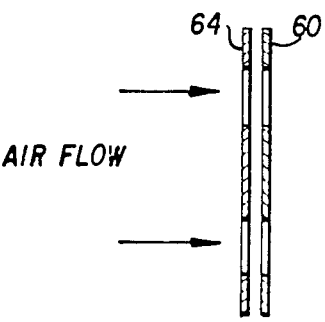
FIG. 5B  AIR FLOW

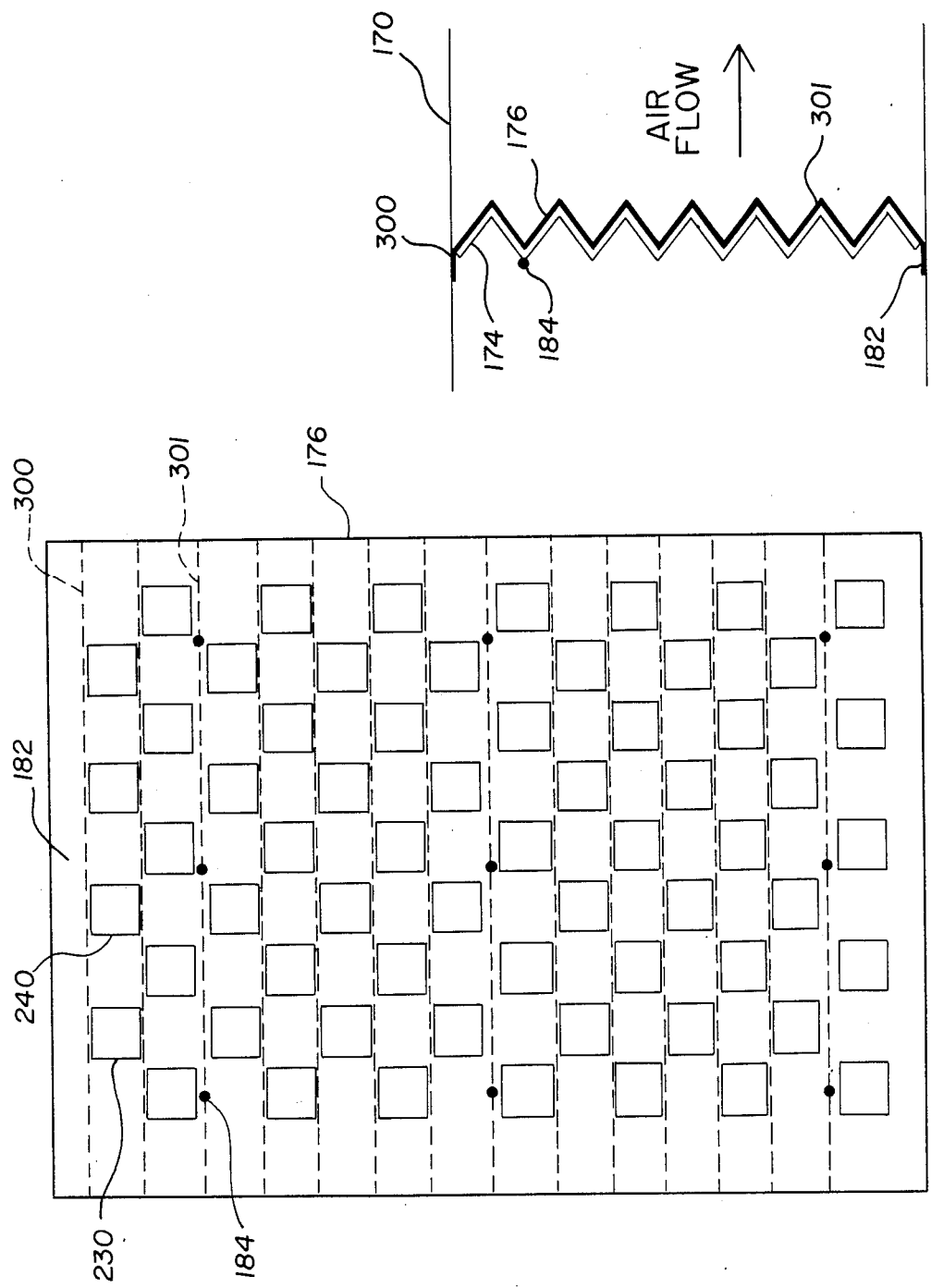

AIR VOLUME REGULATOR VALVE

This application is a continuation-in-part of Application Ser. No. 880,101 filed June 30, 1986 now U.S. Pat. No. 4,739,924, which in turn is a continuation-in-part of Application Ser. No. 712,762filed Mar. 18, 1985 now abandoned.

BACKGROUND OF THE INVENTION

1. Field of the Invention

The invention relates to an air regulator valve having a first sidewall and a second sidewall. Both sidewalls have a plurality of openings. Particularly, the invention relates to a valve in which the sidewalls relative to one another can move from a first open position, to a closed position, to a second open position while moving in a single direction. The valve may also have means for compensating for changes of pressure from an air source. The sidewalls movable relative to one another also may have one sidewall move along a horizontal axis while the other sidewall moves along a vertical axis.

2. Discussion of the Prior Art

Valves for regulating air volume are known in the art. U.S. Pat. No. 3,540,484 to Brown et al discloses an air distribution apparatus for heating, ventilating and air conditioning systems, embodying constant volume regulators and by-pass valves having a hollow cylinder with air passages of predetermined shape and a spring-loaded piston movable axially in the cylinder by a pressure differential to maintain substantially constant volume under varying supply pressures.

It is also known to make valves comprising concentric, apertured cylinders, as shown by U.S. Pat. Nos. 304,443 to Morrison and 3,135,293 to Hulsey.

The use of a spring as part of a system to compensate for pressure changes is shown by U.S. Pat. No. 3,131,716 to Griswold et al. In Griswold et al, the spring acts against the pressure of a fluid source such that the resistance to flow increases when the pressure increases.

However, the above references do not provide an easy-to-maintain valve which can account for changes in pressure of the air source. U.S. Pat. No. 3,135,293 to Hulsey does not accommodate changes in pressure. U.S. Pat. No. 3,131,716 to Griswold et al does not use a rotary motion to regulate airflow. U.S. Pat. No. 3,540,484 to Brown et al does not use a rotary motion to regulate airflow and requires a complicated mechanism to accommodate pressure changes. U.S. Pat. No. 304,443 to Morrison also does not accommodate changes in pressure. Furthermore, the above valves are generally opened by moving a member in one direction and closed by moving the same member in the reverse direction. It would be advantageous to have a valve which permits a valve to be open, then closed, and then opened again while moving the same membeer in a single direction.

U.S. Pat. No. 4,030,518 to Wilcox discloses a sliding plate air flow control valve. However, the valve apparently only has a single open position and a closed position.

OBJECTS OF THE INVENTION

Accordingly, it is a primary object of the invention to provide an air regulator valve that allows a first open position, a closed position and a second open position by movement of a member in a single direction.

It is another object of the invention to provide an air regulator valve that has a 'dead band' in the closed position to facilitate control of ancillary equipment.

It is another object of the invention to provide an air regulator valve that maintains relatively constant airflow when air inlet pressure changes.

It is a further object of the invention to provide an air regulator valve that allows a first slidable sidewall to move along a horizontal axis while a second slidable sidewall moves along a vertical axis on either side of a fixed sidewall.

A still further object of the invention is to provide an air regulator valve having a fixed sidewall with a corrugated shape to which a horizontally movable sidewall is mounted on one side thereof.

SUMMARY OF THE INVENTION

The present invention is a valve which regulates the volume of air passing from an air inlet to an air outlet by moving a first sidewall relative to a second sidewall. The first and second sidewalls have a first and second plurality of openings, respectively, and the first sidewall is slidably overlying the second sidewall so when the openings are aligned, air may pass from the air inlet to the air outlet. The device allows an airflow regulating movement of the two sidewalls relative to one another so that the openings are aligned in a first open position, then they may be unaligned in a closed position, and then they may be aligned in a second open position in which the opening on the first sidewall is aligned with a different opening than in the first position. The movement from the first open position to the closed position to the second open position is in a single direction. Furthermore, the movement from the first open position to the second open position allows for a dead band, during which ancillary equipment, such as heaters or coolers, can be activated for heating, ventilating or air conditioning systems.

The first and second sidewalls may be part of concentric first and second cylinders, respectively. The second cylinder is inside the first cylinder and the sidewalls slidably contact one another or may be only slightly separated, so flow is appreciable only when the openings are aligned in the open positions. When the cylinders are employed, a spring may be attached to the cylinders to aid in compensating for changes in air inlet pressure.

This valve has many advantages, because the spring allows for axial movement of the second cylinder, which results in a relatively constant volume of air to flow despite fluctuations in air inlet pressure. This facilitates controlling the temperature of an area to be heated or cooled by a system which incorporates the valve of the present invention. Another advantage is that the valve allows for a first open position, a closed position and a second open position by moving a member in a single direction. This improves control of heating and cooling, because the valve can change from heating to cooling while moving in a single direction, thus there are no disruptions caused by a change of direction. Furthermore, the valve particularly has the advantage that it provides a dead band, which allows heaters or coolers to be conveniently activated when necessary.

The first and second sidewalls may be slidable relative to each other and to a fixed vertical sidewall having openings therein. The slidable sidewalls are mounted on either side of the fixed sidewall. One of the slidable sidewalls moves along a horizontal axis while the other moves along a vertical axis or at least two slidable sidewalls move along axes which are at right angles to each other. The first slidable sidewall moves from a first position to having its opening in alignment with the openings of the fixed sidewall and second slidable sidewall to a closed position and a second positioning having its opening in alignment with other openings of the fixed sidewall and second slidable sidewall.

BRIEF DESCRIPTION OF THE DRAWINGS

FIG. 1 is a drawing of a preferred embodiment of the valve of the present invention;

FIG. 2 shows a second cylinder of the valve of FIG. 1;

FIG. 3 shows a first cylinder of the valve of FIG. 1;

FIG. 4 shows a cross-section of the valve of FIG. 1;

FIG. 5A shows a second embodiment of the present invention;

FIG. 5B shows a cross-section of the embodiment of FIG. 5A along line D—D;

FIG. 8 shows a fourth embodiment fixed plate of the present invention from an upstream position prior to corrugation; and FIG. 9 shows the fixed plate of FIG. 8 corrugated with a corrugated movable plate on the upstream side thereof.

DESCRIPTION OF THE PREFERRED EMBODIMENTS

Figure 6:
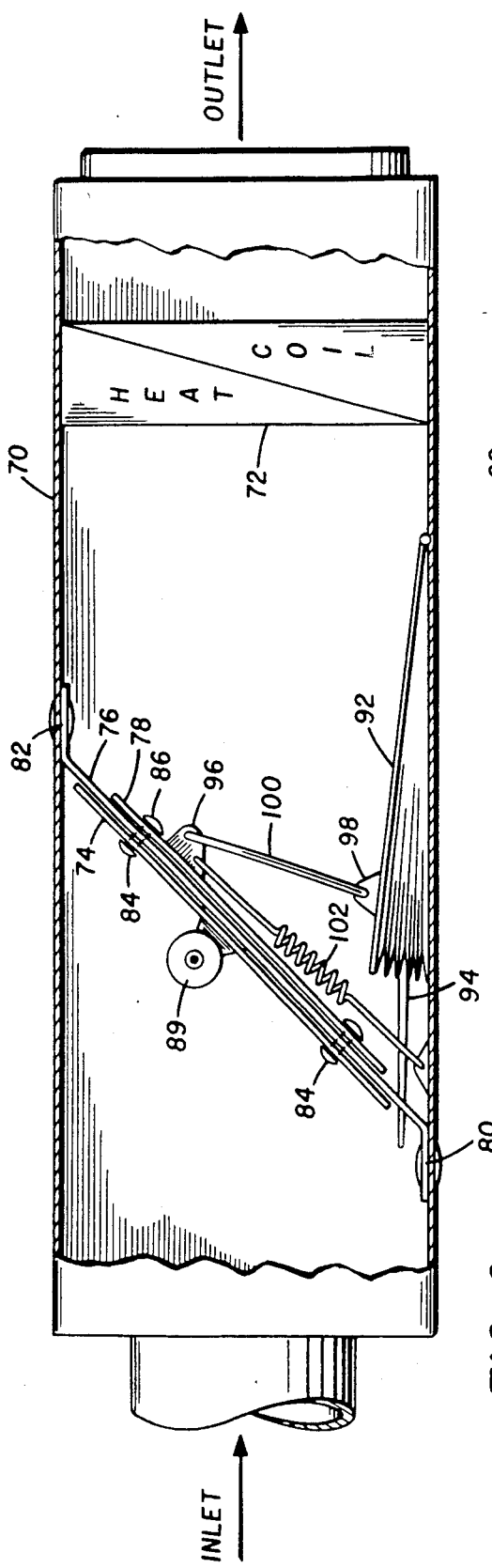
FIG. 6 shows a third embodiment of the present invention.

FIG. 1 shows a preferred embodiment of the present invention. The valve 1 comprises a first cylinder 2 and a second cylinder 6 inside and concentric with first cylinder 2.

The first cylinder 2, as shown in FIGS. 1 and 3, has a sidewall 4 and a first plurality of openings 12. The openings 12 are preferably rectangular. The first cylinder 2 also has a bulkhead flange 24 attached around its perimeter so as not to interfere with airflow out of the cylinder 2 through the openings 12. The cylinder 2 also has a rotation lever slot 22 through which the rotation lever 20 protrudes, as shown in FIG. 1.

As shown in FIG. 2, the second cylinder 6 has second sidewall 8 and end wall 10 attached to the sidewall 8 and a second plurality of openings 14 in the sidewall 8. Preferably, the openings 14 are rectangular. The second cylinder 6 also has a rotation lever 20 attached to the sidewall 8 at a portion toward the opposite end from the end wall 10.

Typically the first cylinder 2 is stationary and the second cylinder 6 moves within first cylinder 2. The second cylinder 6 can both rotate within first cylinder 2 along direction V, which is an airflow regulation movement, and move axially within first cylinder 2 along direction P, to accommodate pressure variation, as discussed below.

FIG. 4 shows the valve 1 installed to connect an air inlet space 40 to an air outlet space 50. The air inlet 40 and air outlet 50 are separated by a barrier 30. The first cylinder 2 is attached to the barrier 30 by the bulkhead flange 24 in order to seal the separation between air inlet 40 and air outlet 50.

The valve 1 regulates the volume of air passing from air inlet space 40 to air outlet space 50 by rotating the second cylinder 6 within first cylinder 2, allowing air to pass through the second cylinder openings 14 when aligned with the first cylinder openings 12. First sidewall 2 may slidably contact second sidewall 8 or may be only slightly separated from sidewall 8, so air flow is negligible when the openings 12, 14 are not aligned. The pressure variances of air inlet 40 are compensated by the axial movement of the second cylinder 6 acting against the spring 26, which varies the axial alignment of the openings 12, 14. The variations in pressure of air inlet 40 are caused primarily by changes in load or demand in various portions of an air distribution system.

Spring 26 is attached to the rotation lever 20 and the bulkhead flange 24. The force exerted by spring 26 varies linearly with the distance it moves, as governed by the following formula:

$$d = p \times A/k$$

where A is the area of end wall 10, d is the distance which the spring moves from an unstretched position, k is the spring constant, and p is the difference in pressure between the air inlet 40 and air outlet 50.

The inside of the sidewall 4 of the first cylinder 2 may be in contact with portions of the sidewall 8 of the second cylinder 6. Therefore, friction may damp the axial movement of the second cylinder 6 to some extent.

The first and second cylinders 2, 6 may be constructed of metal, and optionally either cylinder may be lined with polytetrafloroethylene resins, such as Teflon. The rotation lever may be operated manually or by a temperature control actuator, such as a thermostat 30.

It is important that the airflow regulating movement V allows the valve 1 to rotate from open to closed to open by a stroke in a single direction. This allows a control sequence to reverse within a linear stroke. In a typical operation, air at a specified temperature will pass through the valve 1 in the first open position, in which each first opening 12 is aligned with a second opening 14. When a temperature actuator determines that the temperature downstream of the valve 1 should be changed, the valve 1 moves to the closed position. The heating or cooling coils 40 (schematically shown) downstream of the valve 1 may be activated as necessary while the valve 1 is in the closed position. The coils 40 and valve 1 are housed in a conventional duct 42 for directing air downstream of the valve 1. Then the valve 1 may continue to the second open position, wherein each first opening 12 is aligned with a different second opening 14 than in the first open position, and again allows air at the specified temperature to exit the valve 1 and contact the heating or cooling coils 40. The rotation lever slot 22 is preferably sized, so the rotation lever 20 will only allow a first open position, a closed position, and a second open position.

It is also important that the valve 1 have a "dead band" feature. To form the dead band the length of the arc B between the openings 12 of the first cylinder 4 must be larger than the openings 14 themselves. In addition, the length of the arc A between the openings 14 of the second cylinder 6 must also be greater than the size of the openings 12 themselves. Preferably arcs A, B are about the same size as one another and openings 12, 14 are about the same size as one another. The size relationship of the openings and the arc length between them is necessary to allow for the unique dead band feature of the valve 1. The dead band feature allows the valve 1 to over travel the closed position within a single linear stroke to provide movement to activate microswitches to energize heating coils or cooling coils 40 which are located downstream of the valve. Therefore, the dead band feature gives the valve the flexibility to control whether or not the heating or cooling coils 40 will be activated when the valve is in the closed position.

FIGS. 5A and 5B show another embodiment of the present invention as a flat valve 61, as opposed to the cylindrical valve 1 discussed above. Valve 61 includes a first plate sidewall 60 and a second plate sidewall 64. First plate sidewall 60 has a first plurality of openings 62, which are preferably rectangular. Second plate sidewall 64 has a second plurality of openings 66, which are also preferably rectangular. First plate sidewall 60 and second plate sidewall 64 overlay one another and are slidably mounted relative to one another to allow for a first open position, a closed position and a second open position, as in the case of valve 1 above. The openings 62 of the first plate sidewall 60 are the same size as one another. Likewise, the openings 66 of the second plate sidewall 64 are also the same size as one another. Preferably, all the openings 62, 66 are the same size and the length C, parallel regulatory movement X and between each pair of first openings 62 on the plate sidewall 60, equals the length E parallel regulatory movement X and between each pair of second openings 66 on the plate sidewall 64. Length C is preferably greater than the length of the openings 62, 66 themselves to provide for the "dead band" feature, as described above for the valve 1.

The valve 61 may be operated manually or by a temperature control actuator, such as a thermostat. The valve may also be operated with downstream heating or cooling coils (not shown), and thus have all the advantages from allowing a first open position, a closed position and a second open position, as described above for valve 1. The plate sidewalls 60, 64 may be made of metal and may be lined with polytetrafloroethylene resins, such as Teflon to reduce sliding friction. The plate sidewalls 60, 64 may be in contact with one another or may be slightly separated, as shown in Figure 5B, from one another to reduce friction. If the plate sidewalls 60, 64 are slightly separated from one another, this would allow air to pass through the valve 61 even when it is in the closed position. However, this airflow would be negligible and therefore not impair the operation of the air distribution system.

FIG. 6 illustrates a third embodiment of the present invention mounted in a rectangular duct 70 with a heating coil 72. The valve constitutes three plates 74, 76, 78. Plate 74 has openings 120. Plate 76 has openings 130 and 140. Plate 78 has openings 150 and 160. Plate 76 has flanges 80 and 82 which are bolted, riveted or welded to duct 70. Extending from either side of plate 76 are headed pins 84 and 86. Plate 74 is positioned on the inlet side of plate 76 and slides horizontally on pins 84 in slots 88. Fixed to plate 74 and 76 is a temperature control actuator 89 which moves plate 74 from a position having its opening in alignment with the openings of plate 76 and 78 to a position of non alignment and to a further position of alignment. Plate 78 is mounted by means of pins 86 and slots 90 on the outlet side of plate 76. The slots 88 and 90 have an enlarged terminus to fit over the heads of pins 84 and 86. Mounted within the duct 70 is a bellows 92 in communication with the high pressure side of the valve by a pressure transfer tubes 94. As the pressure varies, the bellows will contract or expand. Mountings 96 and 98 are fixed to plate 78 and bellows 92 respectively and have pivotally attached hereto push rod 100 to move plate 78 upwardly or downwardly dependent on the expansion or contraction of bellows 92. Spring 102 is attached to mounting 96 and duct 70 to bias plate 78 in a downward direction.

Figure 7:
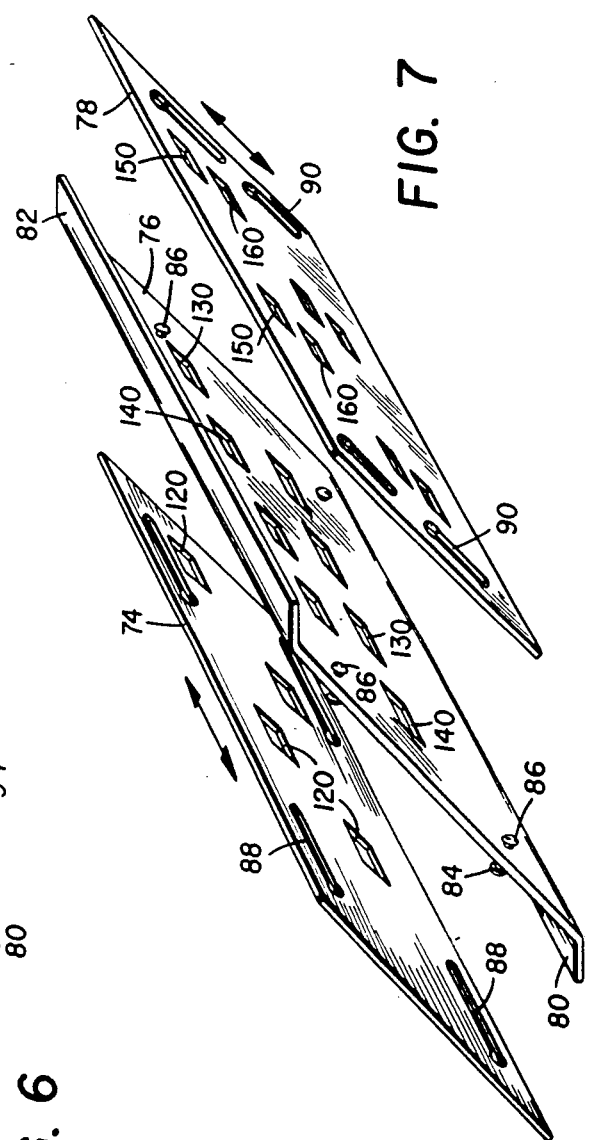
FIG. 7 shows an exploded view of the three plates of FIG. 6.

In the operation of the valve in FIGS. 6 and 7 the openings 130 and 150 in plates 76 and 78 respectively align with the opening 120 if plate 74 is the first open position and openings 140 and 160 in the second open position.

FIGS. 8 and 9 illustrate a preferred fourth embodiment of the present invention in which the fixed plate 176 has a corrugated shape to allow more openings in the air regulating apparatus which reduces the pressure drop for a given flow rate from the apparatus of FIGS. 6 and 7. Fixed plate 176 is bent at 300 to form flange 182 which is fixed to rectangular duct 170. Fixed plate is bent at 301 to take a corrugated shape with the openings therein being only in a planar surface of the corrugation. On the upstream side of fixed plate 176 are mounted on pins 184 a corrugated slotted plate 174 having openings therein similar to plate 74 and which move horizontally in the same manner as plate 74 of FIGS. 6 and 7. The action of registry and non-registry of the openings in plate 174 with the openings in fixed plate 176 are the same as the registry and non-registry of plate 74 with fixed plate 76. The slots in plate 174 has an enlarged terminus to fit over the pins 184.

While specific embodiments of the method and apparatus aspects of the invention have been shown and described, it should be apparent that many modifications can be made thereto without departing from the spirit and scope of the invention. Accordingly, the invention is not limited by the foregoing description, but is only limited by the scope of the claims appended thereto.

I claim:

1. An air regulating apparatus comprising a valve, said valve comprising
    a corrugated fixed sidewall having openings therein;
    a corrugated slidable sidewall having openings complementarily mounted on one side of said fixed corrugated sidewall to move in one direction relative to said fixed corrugated sidewall;
    said corrugated slidable sidewall being in communication with an air inlet;
    said corrugated fixed sidewall being in communication with an air outlet;
    said corrugated slidable sidewall being movable in a single direction from a first open position wherein said openings of said corrugated slidable sidewall are aligned with openings of said fixed corrugated sidewall to a closed position wherein the openings of said corrugated slidable sidewall are not aligned with the openings of said fixed corrugated sidewall and to a second open position wherein said openings of said corrugated slidable sidewall are aligned with openings of said fixed corrugated sidewall, means to move said first slidable sidewalls activated by temperature change,
    said fixed corrugated sidewall having means fixed thereto upon which said corrugated slidable sidewall is slidably mounted thereon.

2. The apparatus of claim 1 wherein said fixed corrugated sidewall means are headed pins.

3. The apparatus of claim 2 wherein said corrugated slidable sidewall has slots therein in which said pins are positioned, said slots having one enlarged terminus to fit over the heads of said pins.

4. The apparatus of claim 3 wherein the slots in the corrugated slidable sidewall are positioned to permit horizontal movement of said corrugated slidable sidewall.

* * * * *